United States Patent Office

2,967,149
Patented Jan. 3, 1961

2,967,149

FILTER AID

Louis S. McCollum, North Hollywood, and Sol Gindoff, Los Angeles, Calif., assignors to International Minerals & Chemical Corporation, a corporation of New York No Drawing. Filed Mar. 28, 1958, Ser. No. 724,504

11 Claims. (Cl. 210—502)

This invention relates to an improved filter aid material having oil adsorbing properties. More particularly, this invention relates to the composition and preparation of an improved filter aid comprised of expanded comminuted perlite particles having fine particles of a non-swelling montmorillonite clay adhering firmly to the surface of the perlite particles.

Crude or raw perlite ore is a volcanic glass having a silica content of about 65 to 70% by weight, together with about 12 to 16% alumina, 2 to 5% entrapped water, 7 to 10% alkali metal oxides, and small amounts of oxides of iron, calcium and magnesium. A characteristic property of perlite and similar volcanic glass containing upwards of 2% water is that when such material is exposed in fine particle form to temperatures in the range of about 1500 to about 2100° F., softening and rapid expansion or puffing of the particles takes place to produce a cellular expanded product having an extremely low density. Because of its low density, chemical inertness, and heat resistance, fully expanded perlite has considerable value as a heat insulating material, and for other applications, such as an aggregate in plaster, concrete and the like.

Expanded comminuted perlite has been used as a filter aid in many filtration operations such as in the filtration of sugar juices, fermented brew, dyes, dye intermediates, metallurgical slimes, and the like. While expanded comminuted perlite filter aid material is an efficient filter aid from the standpoint of filtration rate, in certain operations it has been found that the clarity of the filtrate is inferior to the clarity of the filtrate obtained when other types of filter aids are used.

In certain filtration operations such as the filtration of sludge water and steam condensate collected from steam boilers, it is frequently necessary to remove suspended solids from the liquid as well as traces of oil which may be suspended in the liquid in the form of finely divided droplets. In filtration operations of this type, it is frequently necessary to remove suspended solids by filtering the slurry and then to treat the solids-free liquid to remove oil suspended therein.

It is a primary object of this invention to prepare an improved filter aid material having oil adsorbing properties.

It is another object of this invention to prepare an improved filter aid material from perlite and a non-swelling montmorillonite clay.

Still another object of the invention is to provide a filter aid material capable of producing a filtrate of high clarity without objectionable reduction in the filtration rate.

These and other objects of the invention will be apparent from the following detailed description.

Now it has been discovered that an improved filter aid material having oil adsorbing properties can be prepared by admixing ground perlite ore with a non-swelling type montmorillonite clay to form a homogeneous mixture and heating the mixture to the expansion temperature of perlite. Immediately prior to expansion, the perlite particles soften and become plastic, during which time the clay particles become embedded in the surface of the perlite particles. After expansion and subsequent cooling of the perlite particles, the perlite particles solidify and form a light weight cellular material having clay particles firmly adhering to the outer surfaces. The solidified expanded perlite-clay particles are then comminuted and classified to recover an improved filter aid material.

More in detail, perlite ore, or other volcanic glass, is mined and crushed in a suitable apparatus such as a jaw crusher to reduce the particle size to less than about 4 mesh. The crushed particles are preferably sized as by screening at about 45 mesh. The −4+45 mesh fraction may be treated for use in the preparation of plaster and concrete. The −45 mesh fraction is preferably used to prepare the novel filter aid but coarser or finer particles may be used if desired.

An acidic activated montmorillonite clay is preferably used as a component of the novel filter aid material, but any naturally activated or synthetically activated clay of the non-swelling montmorillonite variety may be used. Bentonite clay mined in the vicinity of Olancha, California, which has been acidified by admixing with an aqueous aluminum sulfate solution, and heating to a temperature of about 450° F. in a suitable heating apparatus such as a rotary kiln, has been found to be particularly suitable as a component of the novel filter aid material.

The acidity of the clay is sufficient to form a slurry having a pH of between about 4 and about 6, and preferably between about 4.5 and about 5.5, when the slurry is prepared by mixing about 2 grams of clay with about 10 milliliters of water.

It is preferred to use clay particles all of which have a diameter less than about 100 microns, but coarser or finer particles may be used if desired.

Ground perlite ore and montmorillonite clay are admixed in proportions to provide clay in an amount equivalent to between about 1 and about 15% by weight of the mixture on a dry basis. When the filter aid is to be used in the filtration of solutions such as sugar juices which contain no oil, it is preferred that clay be admixed with perlite ore in proportions to provide between about 3 and about 5% by weight of the mixture on a dry basis, since the oil adsorbing property of the filter aid is derived primarily from the clay component rather than from the expanded perlite component. Clay in these proportions is sufficient to improve the clarity of the sugar juice filtrate without reducing the filtration rate. However, when a filter aid material is to be used in the filtration of slurries having a relatively high admixture of oil, such as sludge waters and steam boiler condensates, it is preferred that clay be admixed with perlite ore in proportions to provide between about 10 and about 15% by weight of the mixture on a dry basis. A filter aid having these proportions of clay and perlite is particularly suitable for the filtration of slurries such as sludge waters and steam boiler condensates, since not only does the clay component of the filter aid adsorb substantially all of the oil from the slurry, but also the novel filter aid produces a high clarity filtrate without objectionable reduction in filtration rate.

Ground perlite ore and clay in the above described quantities are admixed in a suitable blending apparatus such as a rotary blender. Sufficient moisture should be present in the mixture to permit some adhesion of the clay particles to the surface of the ground perlite ore particles. Generally, the moisture content of the mixture is maintained at between about 2 and about 10% by weight. The moisture content should not exceed about 15% by weight of the mixture since moisture in excess of this amount adversely affects the expansion rate of the perlite. The moisture in the mixture may be provided by adding water to dry ground perlite ore particles and dry clay. However, some free water is generally present in both the ground perlite ore as well as in the clay, and generally this free water is sufficient to provide the moisture necessary to cause the clay particles to adhere to the surface of the perlite particles. However, additional water may be added if desired during the mixing operation, in an amount to provide a total moisture content up to about 15% by weight.

After the ground perlite ore and clay have been admixed to form a substantially homogeneous mixture, the mixture is then heated in a conventional perlite expansion furnace at temperatures sufficient to cause expansion of the perlite. Generally the expansion temperature is between about 1500 and about 2100° F., but may be between about 1100 and about 2200° F., depending upon the composition, moisture content, and particle size of the perlite ore. It is preferred to use a vertical expansion type furnace wherein the mixture is introduced at the bottom of the furnace into an upwardly directed flame and the perlite component of the mixture is expanded almost instantaneously. The particles are carried by the combustion gases to the top of the furnace where they are discharged. When the mixture is first introduced into the flame, there is a momentary softening of the perlite particles during which time the clay particles become embedded in the soft surface of the perlite. When an acidic non-swelling type montmorillonite clay treated with aluminum sulfate solution as described above is used as the clay component, it is believed that the aluminum sulfate on the surface of the clay acts as a flux when heated to perlite expansion temperatures, which forms a strong bond between the clay and perlite upon cooling. Immediately after the perlite particles soften, there is an expansion of the particles whereby cellular light weight perlite particles are produced. The expanded perlite particles are conveyed from the hottest portion of the flame to the discharge end of the furnace during which time the temperature of the particles is substantially reduced, thereby causing complete solidification. During this phase the perlite particles as well as the bond between the perlite particles and clay are solidified, thereby producing expanded perlite particles having finely divided clay particles firmly adhering to the surface of the perlite.

The expanded perlite-clay material is then comminuted in a suitable apparatus such as is described by Gindoff et al., U.S. patent application Serial No. 410,065 (filed February 15, 1954), which issued as U.S. Patent No. 2,853,241 on September 23, 1958, and by J. Z. Goldberg, U.S. Patent No. 2,808,212 (issued October 1, 1957). In apparatus of the type disclosed in these references, expanded perlite from the expansion furnace is conveyed at a high velocity against the serrated surfaces of a series of comminuting elements. Other types of comminuting apparatus may be used, such as a ball mill, attrition grinder and the like.

Since the effectiveness of the filter aid material is dependent upon the particle size of the filter aid, it is preferred to comminute the expanded perlite-clay material from the furnace to produce a material having a particle size substantially all of which is between about 15 and about 200 microns. However, coarser or finer particles may be used satisfactorily depending upon the type of filtration operation in which the filter aid material is to be employed. It will be recognized by those skilled in the art that comminution of the material to a specific particle size range is not always readily obtained. Therefore, it may be necessary to classify the product of the comminution apparatus and to separate coarse and fine particles from particles having the desired size. The coarse and fine particles separated in the classification step may be suitably recycled or may be used in filtration operations where filter aids having these particular particle sizes are desired or necessary.

It has been found that the novel filter aid material prepared in accordance with this procedure not only produces a filtrate having improved clarity without material reduction in filtration rate, but also adsorbs entrained oil from water. In addition, the clay component of the filter aid removes red, blue, and green color bodies from oils and aqueous solutions, thereby having a bleaching effect upon the solutions. As a result the novel filter aid material prepared in accordance with the above described novel procedure has improved filtration properties, oil adsorbing properties, and bleaching properties.

As illustrative of the character of the instant invention, but in no way intending to be limited thereto, the following examples are described. All parts and percentages are by weight unless otherwise specified.

*Example 1*

Perlite ore mined in the vicinity of Fish Springs, California, was crushed to pass through a 3/16" screen and dried at about 120° C. in a rotary dryer. The dryer product was screened at about 45 mesh. Coarse particles from the screen were stored for use in preparing perlite plaster aggregate, and fine particles were stored for use in the preparation of the novel filter aid, as described more fully below.

An acidic activated clay was prepared by admixing bentonite clay mined in the vicinity of Olancha, California, with an aqueous aluminum sulfate solution in an amount equivalent to about 4% aluminum sulfate based upon the combined weight of aluminum sulfate and clay. The mixture of clay and aluminum sulfate was heated to a temperature of about 450° F. The pH of the slurry prepared by admixing one gram of activated clay with five milliliters of water was about 4.6.

A portion of the −45 mesh perlite ore from the screen (97 parts), acidic activated bentonite clay (3 parts) and water (about 10 parts) were admixed in a rotary blender for about 20 minutes. The mixture of perlite, clay and water from the rotary blender was heated in a vertical expansion furnace at a temperature of about 1600° F. to cause expansion of the perlite to form firmly adhering bonds between the clay and expanded perlite particles.

Expanded perlite-clay aggregates discharged from the top of the furnace were comminuted by passing the solids through an abrading apparatus of the type described in the aforesaid U.S. Patent No. 2,853,241. Approximate screen analysis of the comminuted material was as follows:

| Screen size: | Proportion, percent |
|---|---|
| +80 mesh | 2.0 |
| −80+100 mesh | 6.0 |
| −100+200 mesh | 22.0 |
| −200+325 mesh | 35.0 |
| −325 mesh | 35.0 |

The comminuted material was passed at a high velocity through a cyclone separator where coarse particles were discharged at the apex of the cyclone and fine particles were discharged through the opening at the top of the cyclone. The approximate screen analysis of the particles discharged at the bottom of the cyclone was as follows:

| Screen size: | Proportion, percent |
|---|---|
| +80 mesh | 2.0 |
| −80+100 mesh | 12.0 |
| −100+200 mesh | 26.0 |
| −200+325 mesh | 45.0 |
| −325 mesh | 15.0 |

The density of this material was about 12 pounds per cubic foot.

About 5 grams of our novel filter aid having the above screen analysis was admixed with a solution of 2 pounds of raw sugar dissolved in 770 ml. of water, said solution having a specific gravity of about 60° Brix. The resulting slurry was filtered in a standard laboratory "Bomb" type filter press at a pressure of 10 p.s.i.g and at a temperature of 180° F. Filtrate was collected from the filter press for 21 minutes. The clarity of the filtrate was measured using a Kopke turbidimeter following the procedure set forth in Physical and Chemical Methods of Sugar Analysis, by C. A. Browne and F. W. Zerban, third edition, June 1955, John Wiley & Sons, Inc., page 625.

For comparison, ground perlite ore was expanded, comminuted, and classified, and tested in accordance with the procedure set forth above with the exception that no clay was admixed with the perlite prior to expansion.

For further comparison, a filtration test was run under the same conditions on a conventional diatomaceous earth.

Results of the filtration tests are set forth below.

| Filter Aid | 97% Perlite, 3% Clay | 100% Perlite | Diatomaceous Earth |
|---|---|---|---|
| Flow Rate, percent diatom. earth | 138 | 130 | 100 |
| Clarity of Filtrate Kopke, millimeters | 49 | 38 | 42 |

Thus, it can be seen that the use of our novel filter aid resulted in an improved filtration rate as well as improved filtrate clarity as compared to diatomaceous earth. Conventional perlite filter aid results in improved filtration rate as compared to diatomaceous earth, but inferior filtrate clarity.

*Example II*

Ground perlite ore (85 parts) and acidic non-swelling montmorillonite clay (15 parts) were admixed with about 15 parts of water in a rotary blender. The mixture was fed to a vertical perlite expansion furnace and heated to a temperature of about 1600° F. to expand the perlite and to cause the clay particles to become embedded in and firmly secured to the surface of the expanded perlite. The material discharged from the expansion furnace was then comminuted in an apparatus of the type described in the aforesaid U.S. Patent No. 2,853,241. The comminuted material was then classified in a cyclone separator as described in Example I.

The novel filter aid material from the apex of the cyclone separator was slurried with a water-oil emulsion containing about 1% oil and about 0.5% suspended solids to give a slurry of filter aid and water-oil emulsion containing about 0.5 part of filter aid per 99.5 parts of water-oil emulsion.

The slurry was filtered in the laboratory filter press of Example I at a pressure of 10 p.s.i.g. After filtration of the slurry, a portion of the moist filter cake was heated to dryness at a temperature of about 160° F., then cooled. The dry filter aid containing adsorbed oil weighed 1.5 grams. The dry filter aid was then ignited in a direct natural gas flame to volatilize the oil adsorbed thereon. After cooling, the weight of the filter aid was 0.6 gram. This result shows that the filter aid adsorbed 0.9 gram of oil, corresponding to 150% oil adsorption based upon the weight of the dry filter aid.

Having now thus fully described and illustrated this invention, what is desired to be secured by Letters Patent is:

1. An aggregate consisting essentially of firmly adhering particles of expanded perlite and a non-swelling montmorillonite clay, wherein said clay particles are embedded in the outer surface of said expanded perlite particles, said aggregate having a particle size below about 200 microns.

2. The aggregate of claim 1 wherein said clay is an acidic non-swelling montmorillonite clay.

3. The aggregate of claim 1, wherein the particle size is between about 15 and about 200 microns.

4. The aggregate of claim 1, wherein said clay is present in an amount equivalent to between about 1 and about 15% by weight of said aggregate.

5. The aggregate of claim 1 wherein said clay is present in an amount equivalent to between about 3 and about 5% by weight of said aggregate.

6. The aggregate of claim 1 wherein said clay is present in an amount equivalent to between about 10 and about 15% by weight of said aggregate.

7. The method of preparing an improved filter aid which comprises admixing ground perlite ore particles and an acidic non-swelling montmorillonite clay to form a substantially homogeneous mixture, heating the mixture to a temperature between about 1500° F. and about 2100° F., whereby the perlite ore particles are expanded and whereby aggregates of expanded perlite particles and clay particles are produced, said clay particles being embedded in the outer surface of said expanded perlite particles, comminuting the resulting aggregates, and separating aggregates having a particle size between about 15 and about 200 microns.

8. The method of claim 7 wherein said clay is added to the mixture in an amount equivalent to between about 1 and about 15% by weight of said mixture.

9. The method of claim 7 wherein said clay is added to the mixture in an amount equivalent to between about 3 and about 5% by weight of said mixture.

10. The method of claim 7 wherein said clay is added to the mixture in an amount equivalent to between about 10 and about 15% by weight of said mixture.

11. The method of claim 7 wherein the moisture content of the said mixture prior to heating is between about 5 and about 15% by weight of said mixture.

References Cited in the file of this patent

UNITED STATES PATENTS

| | | |
|---|---|---|
| 2,283,174 | Bates | May 19, 1942 |
| 2,292,632 | Greger | Aug. 11, 1942 |
| 2,388,060 | Hicks | Oct. 30, 1945 |
| 2,501,962 | Pierce | Mar. 28, 1950 |
| 2,526,073 | Gardner | Oct. 17, 1950 |
| 2,585,366 | Bollaert | Feb. 12, 1952 |
| 2,626,864 | Miscall | Jan. 27, 1953 |
| 2,665,813 | Bollaert | Jan. 12, 1954 |
| 2,683,690 | Armentrout | July 13, 1954 |
| 2,791,496 | Rice | May 7, 1957 |

OTHER REFERENCES

Ladoo and Myers: "Nonmetallic Minerals" (Div. 64), second edition, McGraw-Hill Co., New York (1951), pages 94-96.